United States Patent [19]
Bennett et al.

[11] Patent Number: 4,908,859
[45] Date of Patent: Mar. 13, 1990

[54] RECEIVER ACCESS INTERFACE TO SERVICE COMPONENTS IN TELEVISION CHANNEL

[75] Inventors: Christopher J. Bennett, San Diego; James M. Hobza, Carlsbad; Ron D. Katznelson, San Diego; Gordon K. Walker, Carlsbad, all of Calif.

[73] Assignees: M/A-COM Government Systems, Inc.; Cable/Home Communication Corp., both of San Diego, Calif.

[21] Appl. No.: 147,167

[22] Filed: Jan. 22, 1988

Related U.S. Application Data

[63] Continuation-in-part of Ser. No. 909,509, Sep. 19, 1986, abandoned.

[51] Int. Cl.$^4$ .............................................. H04N 7/167
[52] U.S. Cl. ...................................... 380/10; 380/13; 380/20; 380/34
[58] Field of Search ....................... 380/10, 13, 20, 34; 358/349, 86; 375/1; 455/3, 6

[56] References Cited

U.S. PATENT DOCUMENTS

| | | | |
|---|---|---|---|
| 3,245,157 | 4/1966 | Laviana | 35/9 |
| 3,580,989 | 5/1971 | Banning, Jr. | 380/10 |
| 3,789,131 | 1/1974 | Harney | 380/13 |
| 3,826,863 | 7/1974 | Johnson | 380/13 |
| 3,936,594 | 2/1976 | Schubin et al. | 380/13 |
| 4,329,711 | 5/1982 | Cheung | 380/34 |
| 4,355,399 | 10/1982 | Timor | 375/1 |
| 4,355,415 | 10/1982 | George et al. | 455/185 |
| 4,586,077 | 4/1988 | Wonn et al. | 358/349 |
| 4,599,646 | 7/1986 | Cottam | 380/15 |
| 4,603,399 | 7/1986 | Robbins | 358/86 |
| 4,646,160 | 2/1987 | Robbins et al. | 358/144 |
| 4,654,705 | 3/1987 | Forbes et al. | 380/19 |
| 4,677,685 | 6/1987 | Kurisu | 380/20 X |
| 4,685,131 | 8/1987 | Horne | 380/20 |
| 4,716,587 | 12/1987 | Fausone et al. | 380/10 |
| 4,792,972 | 12/1988 | Cook, Jr. | 380/20 |

Primary Examiner—Thomas H. Tarcza
Assistant Examiner—Linda J. Wallace
Attorney, Agent, or Firm—Edward W. Callan

[57] ABSTRACT

A receiver interface system for enabling an operator to access different types of services in a like manner, wherein the services contain different combinations of service components received by a receiver in different portions of one or more different frequency channels, such as television channels. The system includes a plurality of separate interface channels for carrying different types of services containing different combinations of the service components; switching means for selecting a said service, wherein the switching means is coupled to the interface channels for accessing the respective interface channels in a like manner; and a decoder coupled to the receiver and the interface channels for accessing the components of said selected service received by the receiver in different portions of one or more different frequency channels to provide said selected service on the interface channel carrying the selected service. The decoder includes a service definition table defining access to different combinations of the service components by each of a plurality of the separate interface channels to thereby define access to different types of services by the separate interface channels; and a channel configuration map defining access to the frequency channels by the separate interface channels for enabling the different combinations of service components for each of the services to be accessed in accordance with the service definition table. The service definition table may include means for defining access to different service components located in the same portion of a given frequency channel at different times and/or may define access to different service components located in the following portions of the given frequency channel with respect to a television signal received over the given frequency channel: the video information interval, the horizontal blanking interval, the vertical blanking interval and the subcarrier of the given frequency.

15 Claims, 2 Drawing Sheets

RECEIVER ACCESS INTERFACE TO SERVICE COMPONENTS IN TELEVISION CHANNEL

CROSS REFERENCE TO RELATED APPLICATION

This application is a continuation-in-part of Application No. 909,509 filed Sept. 19, 1986, now abandoned.

BACKGROUND OF THE INVENTION

The present invention generally pertains to communications systems and is particularly directed to a receiver interface system for enabling an operator to access different types of services received by a receiver. The different types of services respectively contain different types of combinations of one or more service components respectively received by the receiver in different portions of one or more different frequency channels, such as television channels.

SUMMARY OF THE INVENTION

The present invention provides a receiver interface system for enabling an operator to access different services in a like manner, wherein some of the different services contain different types of combinations of one or more service components received by a receiver in different portions of one or more different frequency channels.

The receiver interface system of the present invention includes a plurality of separate interface channels for carrying different services containing different combinations of the service components; switching means for selecting a said service, wherein the switching means is coupled to the interface channels for accessing the respective interface channels in a like manner; and a decoder coupled to the receiver and the interface channels for accessing the components of said selected service received by the receiver in different portions of one or more different frequency channels to provide said selected service on the interface channel carrying the selected service. The decoder includes a service definition table defining access to different combinations of the service components by each of a plurality of the separate interface channels, including access to different types of combinations of the service components by some of the separate interface channels, to thereby define access to different services by the separate interface channels; and a channel configuration map defining access to the frequency channels by the separate interface channels for enabling the different combinations of service components for each of the services to be accessed in accordance with the service definition table.

The service definition table may include means for defining access to different service components located in the same portion of a given frequency channel at different times and/or may define access to different service components located in the following portions of the given frequency channel with respect to a television signal received over the given frequency channel: the video information interval, the horizontal blanking interval, the vertical blanking interval and the subcarrier of the given frequency.

Additional features of the present invention are described in the description of the preferred embodiment.

DESCRIPTION OF THE PREFERRED EMBODIMENT

Figure 1:
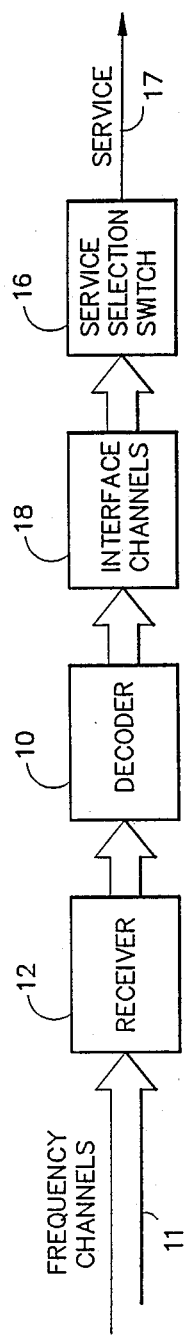
FIG. 1 is a block diagram of a preferred embodiment of the receiver interface system of the present invention.

Referring to FIG. 1, a preferred embodiment of a receiver interface system according to the present invention includes a decoder 10 coupled to a receiver 12, a selection switch 16, and a plurality of interface channels 18. The receiver 12 receives a plurality of different service components in different portions of one or more different frequency channels 11. The decoder 10 defines access by the interface channels 18 to different combinations of the service components in the frequency channels 11 received by the receiver 12 so as to provide different services in the respective interface channels 18. The service selection switch 16 is coupled to the interface channels 18 for accessing the respective interface channels 18 in order to select a given service 17. The service selection switch 16 accesses all of the interface channels 18 in a like manner.

Figure 2:
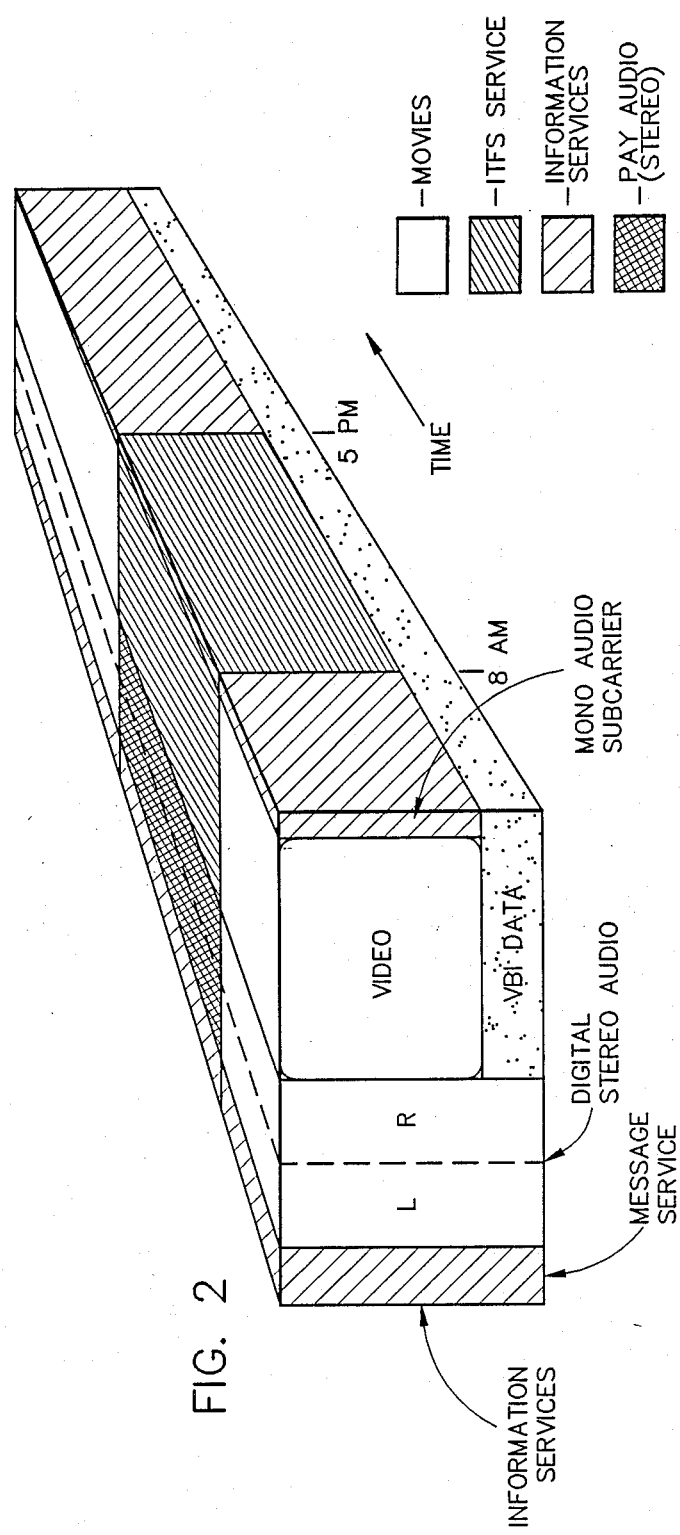
FIG. 2 illustrates the transmission of different service components in different portions of a single video channel with respect to time.

The information structure of a multi-service-component frequency channel containing a plurality of different service components is illustrated in FIG. 2. This channel carries a number of video and audio components, as well as data components in the control channel, in the horizontal blanking interval (HBI) and the vertical blanking interval (VBI), as well as in the audio subcarrier of the video channel. A meaningful combination of such service components is a service. Subscribers purchase access to services. Services are provided independent of the frequency of the channel on which the service components are received; and in fact the frequency on which the service components are received may change from time to time. Such changes are hidden from the subscriber; whereby a given service is always selected using the same service numbers in the service selection switch 16, regardless of the current frequencies of the channels in which the service components are received.

Figure 3:
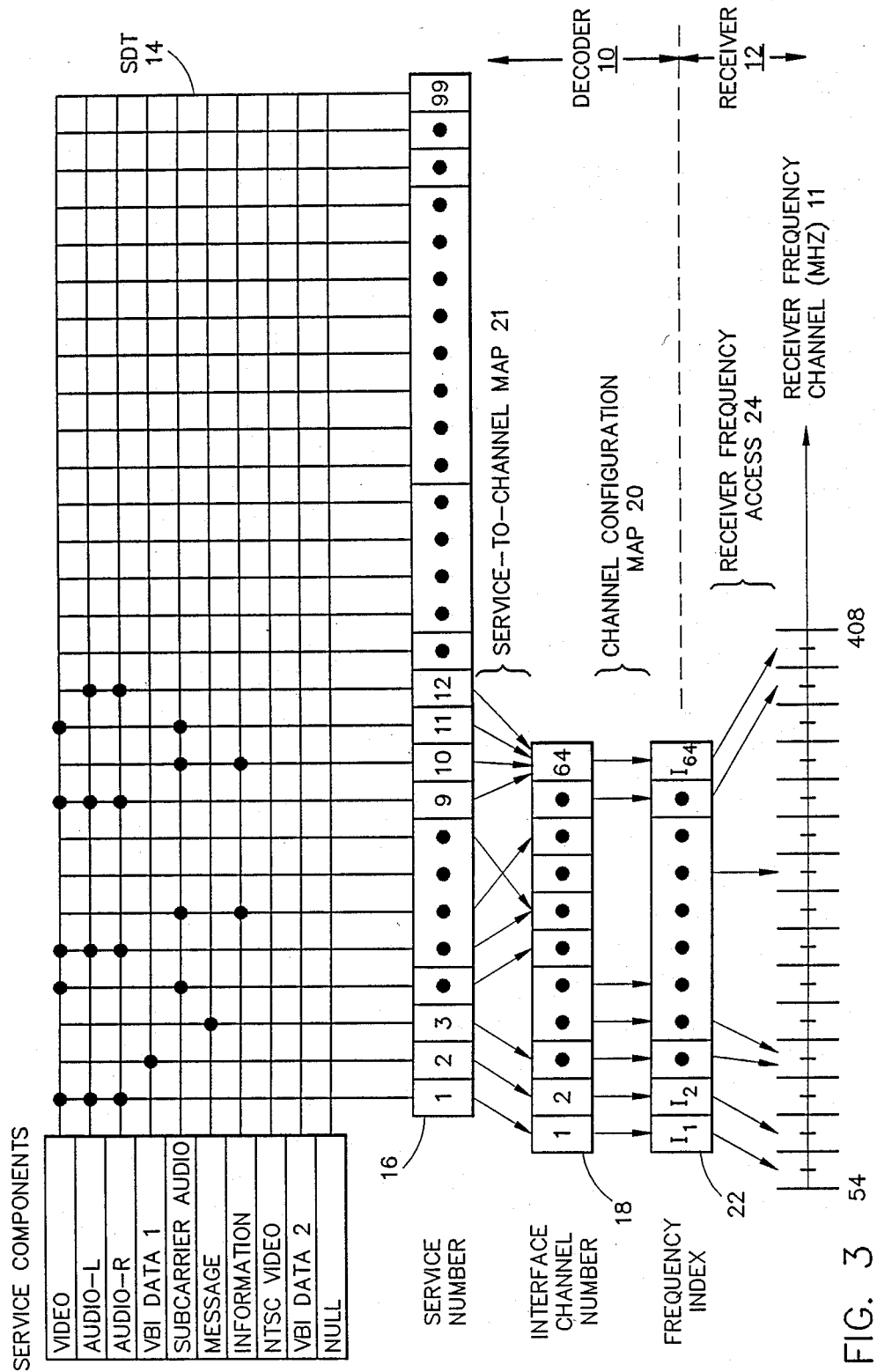
FIG. 3 is a functional diagram of a preferred embodiment of the receiver interface system of the present invention.

The decoder 10 is included in a digital signal processor. Referring to FIG. 3, the decoder 10 includes a service definition table 14, a channel configuration map 20, and a service-to-channel map 21. The service definition table 14, the channel configuration map 20, and the service-to-channel map 21 are all programmable and may be changed from time to time.

The service definition table 14 defines access to different combinations of the service components by each of a plurality of the separate interface channels 18, including access to different types of combinations of the service components by some of the separate interface channels, to thereby define access to different services by the separate interface channels.

The channel configuration map 20 defines access to the frequency channels 11 by the separate interface channels 18 for enabling the different combinations of service components for each of the services to be accessed in accordance with the service definition table 14.

The service-to-channel map 21 defines which services are provided on which interface channels 18. The service-to-channel map 21 allows up to 99 different services 16 to be accessed by the service selection switch 16 from up to 64 interface channels 18. In other embodiments, the number of different services that may be accessed may differ from 99 and the number of interface channels may differ from 64.

The service definition table 14 is made up of a set of mapping tables to translate received service components in the receiver frequency channels 11 into a physical frequency and a set of waveform components. The service definition table (SDT) 14 maps access of the service selected by the user to an interface channel 18. There is a one-byte index into the channel configuration table 20, which is a list of up to 64 frequency indices. The structure of the channel configuration table 20 is explained in more detail below. In order to acquire a service, the decoder 10 finds the frequency index 22 associated with the selected service and gives it to the receiver 12, which then accesses that receiver frequency channel 11.

As well as defining the interface channel 18 on which a service is to be found, the SDT 14 defines the type of service by defining where the service components making up the service are to be found in the frequency channel 11, and how the signals there are to be interpreted. Up to 64 service types may be defined, each of which represents a legitimate combination of video, audio and control channel components. An additional type value is used as a "pseudo-type" to define a null service type. Services which are unused are defined as being null.

The components of the different service types are found in different portions of the respective frequency channels 11; and several different services may be found on the same frequency channel 11. The service concept allows the decoder 10 to hide these complications from the receiver 12. The video component is found in lines 22 through 263 and 284 through 525. Audio components are found in either the NTSC subcarrier, or in the horizontal blanking interval (HBI), where they may be separated into left and right audio components, or treated as a single stereo component. The text components of information services, passive text services and the personal message service are found in the control channel portion of the video channel. Teletext services may be found in lines 10 through 21 in both fields.

Normally, different instances of a given service type will be on different frequencies. Some services may share the same frequency but be available at different periodically recurring intervals, as illustrated in FIG. 2. Occasionally, a service type may be limited to one instance which is copied over all frequencies. The personal message service is an example of this. The information service can be offered in either mode. Knowledge of how to handle the characteristics of a service is part of the decoder 10 hardware and firmware.

Finally, the SDT 14 describes ancillary service characteristics that may be associated with a service. These may be thought of as variations on the basic service type, and are generally encoded as different types. The characteristics that may be defined in the preferred embodiment are described below.

Waveform Type: A service may be carried on a multiple services (MS) waveform or on a standard NTSC waveform. Only television services are carried on an NTSC waveform. Note that this is a characteristic of the service. Thus, it does not change if a service waveform is forced into an NTSC waveform at the transmission headed as a bypass mode due to some encoder failure. This is how the decoder can distinguish a unique service in a bypass mode from an NTSC-waveform television service.

Access Control: A controlled service is one for which a tier authorization is required. Such authorization may be enforced in accordance with encryption of tier-controlled services using an apparatus such as described in U.S. Pat. No. 4,712,238. All services using HBI digital audio are necessarily controlled services, as the audio is scrambled and a program rekey message must be acquired to unscramble it. The program rekey message provides access control information for the service. The NTSC video service cannot be controlled as there is no control channel associated with the service. Other services, such as information services not associated with HBI audio, may or may not be controlled. Normally control is implemented through receipt of a program rekey message.

Universality: A universal service is one which may be found on any receiver frequency channel receiving a multi-service-component waveform. The information service may be implemented as a single universal service. Knowledge of universality allows acquisition despite a failure of transmission on the channel nominally carrying the service.

Stability: A stable service is one whose channel mapping is guaranteed not to change in the normal course of system operation. Off-air VHF television services are stable in a system which receives then along with other multichannel microwave distribution systems (MMDS). Scrambled services in MMDS systems may normally not be stable in this sense, and services available only at certain times are by definition unstable. Knowledge of service stability can significantly reduce service acquisition time during retuning.

Activity: A service is always associated with a channel, unless the service ID is never used. However, the service may not always be available, for example, if a given receiver frequency channel is time-shared between two services of the same type.

Audio source: Audio may be carried in either the HBI or the NTSC audio subcarrier on an MS waveform. The audio for a television service may be found in one of the aforementioned service components, while a separate audio service is available in the other. Only the service carrying its audio in the HBI normally would be scrambled.

The service type is encoded in the SDT 14 to reflect both the basic service type (e.g., video plug audio) and the variants in characteristic (e.g., scrambled video waveform plus subcarrier audio plus uncontrolled access). The headend system maintains a list of service definitions in its copy of the service definition table which defines the service characteristics when the service is on-air, and a schedule showing when the service is not on-air, or when it changes its receiver frequency channel. The decoder 10 maintains only the current definition of the services. For this reason, a decoder 10 tuning to an unstable service from a channel that is not in a multi-service-component waveform in a normal transmission mode must always first tune to a channel carrying a stable MS waveform and acquire the most recent SDT 14.

A decoder 10 requested to tune to a service which is a null type or which is currently off-air will inspect its SDT 14 entry for service 0, which is not directly accessible to the user. If service 0 is itself defined to be a null service type, the decoder 10 shall display a canned message informing the user that the service he requested is not currently available. If service 0 is defined to be an information service, the decoder 10 shall tune to that service and search for and display the page number whose identification number (ID) is the ID of the service initially selected by the user. The page will contain information about the availability of the service that the user requested.

A service change occurs when the headend control computer issues a service definition message indicating a different service definition from that previously issued for the service. The link between the control computer and the headend is constantly monitored by a video switch, which processes all service definition updates, and on noticing a change causes that change to be effected. If the service change also involves a change of waveform, the headend carrying the service must be placed into or taken out of bypass mode. The headend is placed into bypass mode after a service change is broadcast, and is taken out of bypass mode before a service change is broadcast.

When the headend issues a service change, that change is broadcast on all multiple-service-component channels, and comes into effect immediately, possibly causing a glitch on the screens of viewers tuned to that service.

Service definition messages are distributed often enough to ensure rapid acquisition of current service information, both for decoders returning from a non-multiple-service-component-waveform channel to an unstable service, and for installation support. An entire service definition table of 100 entries is broadcast every second.

The decoder 10 monitors the service definition for its current service on every SDT 14 update. If the definition is changed, the decoder 10 will track the change. If the decoder 10 sees a change from an MS waveform to an NTSC waveform, it will seek for and acquire a service in an MS waveform and a normal transmission mode (which may be scrambled), and acquire the current SDT entry on that service. The decoder 10 will then obey that NTSC entry, which will indicate either that the service should be in an MS waveform (in which case it is in bypass) or that it has changed channels, or that it has gone off-air. In the last two cases, the channel is now being used by an NTSC service.

The service definition message (MS systems only) is configured as shown in Table 1. The message is used to determine generic features of services offered on different channels. The message contains definitions for 20 services.

TABLE 1

Service Definition Message Format

| BYTE | DEFINITION |
|---|---|
| 1 | FLAG CHARACTER |
| 2 | MESSAGE TYPE BYTE 94H [BROADCAST] |
| 3 | SUPPLIER ID |
| 4 | SERVICE ID RANGE |
| 5–6 | SERVICE DEFINITION 1 |
| . | . |
| 43–44 | SERVICE DEFINITION 20 |
| 45–48 | CRC |

The supplier ID identifies the supplier of the service definition message. It is the low byte of the category address.

The category address is a 16-bit number representing the category into which a decoder 10 has been placed.

The service ID range byte identifies the first of 20 consecutive services being described. The value of this byte shall not exceed 80.

The remainder of the message consists of 20 service definitions. The format of a service definition is defined in Table 2.

TABLE 2

Service Definition Format

| BYTE | BITS | DEFINITION | |
|---|---|---|---|
| 0[LSB] | 7 | STABLE | [0 = UNSTABLE/ 1 = STABLE] |
|  | 6 | ACTIVE | [0 = INACTIVE/1 = ACTIVE] |
|  | 5–0 | SERVICE TYPE | |
| 1[MSB] | 7 | UNIVERSAL | [0 = TIED/1 = UNIVERSAL] |
|  | 5–0 | CHANNEL NUMBER | |

Bit 7 of byte 0, if set to 1, indicates that the definition is stable, and can be used without questions for transitions from non-MULTIPLE-SERVICE-COMPONENT waveform channels. If set to 0, these transitions require acquisition of a current value for the entry when making transitions from a non-MS waveform channel.

Bit 6 of byte 0, if set to 1, indicates that the service is currently active on the associated channel. If set to 0, the service is not currently active on the associated channel. The setting of bit 6 is ignored if bit 7 is set to 1 or if bit 6 is overridden by the scrambler in the frame count message.

The defined service types for the preferred embodiment are shown in Table 3.

TABLE 3

Service Types

| BITS | DEFINITION |
|---|---|
| 543210 | |
| 000000 | NULL |
| 000001 | VIDEO (NO AUDIO) |
| 000010 | PASSIVE TEXT (NO AUDIO) |
| 000100 | INFORMATION SERVICE (NO AUDIO) |
| 000100 | HBI AUDIO LEFT |
| 000101 | PASSIVE TEXT + HBI AUDIO LEFT |
| 000111 | INFORMATION SERVICE + HBI AUDIO LEFT |
| 001000 | HBI AUDIO RIGHT |
| 001001 | PASSIVE TEXT + HBI AUDIO RIGHT |
| 001011 | INFORMATION SERVICE + HBI AUDIO RIGHT |
| 001100 | COMBINED HBI AUDIO |
| 001101 | VIDEO + COMBINED HBI AUDIO |
| 001110 | PASSIVE TEXT + COMBINED HBI AUDIO |
| 001111 | INFORMATION SERVICE + COMBINED HBI AUDIO |
| 010000 | SUBCARRIER AUDIO |
| 010001 | NTSC VIDEO + SUBCARRIER AUDIO (UNCONTROLLED) |
| 010010 | PASSIVE TEXT + SUBCARRIER AUDIO |

TABLE 3-continued

Service Types

| BITS | DEFINITION |
|---|---|
| 010011 | INFORMATION SERVICE + SUBCARRIER AUDIO |
| 010100 | VIDEO + SUBCARRIER AUDIO |
| 010101 | VIDEO + SUBCARRIER AUDIO + HBI AUDIO LEFT |
| 010110 | VIDEO + SUBCARRIER AUDIO + COMBINED HBI AUDIO |
| 010111 | PERSONAL MESSAGE SERVICE (UNIVERSAL, NO AUDIO) |
| 011000 | UNCONTROLLED SUBCARRIER AUDIO |
| 011001 | UNCONTROLLED VIDEO (NO AUDIO) |
| 011010 | UNCONTROLLED INFORMATION SERVICE (NO AUDIO) |
| 011011 | UNCONTROLLED INFORMATION SERVICE + SUBCARRIER AUDIO |
| 011100 | UNCONTROLLED VIDEO + SUBCARRIER AUDIO |
| 011101 | VBI, LINE 10, PART 1 |
| 011110 | VBI, LINE 10, PART 2 |
| 011111 | VBI, LINE 11, PART 1 |
| 100000 | VBI, LINE 11, PART 2 |
| . | |
| . | |
| . | |
| 111111 | [RESERVED] |

The "VIDEO" service component identified in Table 3 is non-NTSC video, such as scrambled video.

The null type may be stable (indicating that the service is never defined) or unstable (indicating that the service may occasionally be defined, e.g., a one-time pay-per-view service). It is always inactive.

The definition of a service normally on an MS waveform is not changed if the headend supporting that service goes into bypass mode. This is how the decoder differentiates bypass from an NTSC-format service.

HBI audio may be protected via an encryption keystream. Services using HBI audio must all use the same associated program encryption key. This is obtained through the program rekey message. If HBI audio on a channel is shared between more than one service, separate program rekey messages must be distributed for each service.

All audio channels associated with a service type carry the same audio (or possible stereo L and R if both HBI channels are used) unless the program rekey message for the service marks the current program as being bilingual. In that case, the different channels carry primary and alternate languages.

Services are access-controlled unless otherwise specified. A preferred technique of access control is described in U.S. Pat. No. 4,712,238, issued Dec. 8, 1987. Access control is exercised through the program rekey message, except for passive text services which use the tier fields of the tier-addressed screen message. Passive text services associated with HBI audio require both forms of control: the tier masks must agree.

Impulse purchase may only be offered on video and audio services which use the HBI audio channels. If the left and right HBI channels on a given frequency band are used by different services, only one of these services may offer impulse purchase.

Certain service IDs may be reserved. For example, service 0 may only be assigned to an uncontrolled information service with no audio and must be stable; service 1 is the only service that may carry the personal message service; and services 2-13 must be NTSC video services and a service that is protected through the tier mechanism must have an ID in the range 14-70. If these assignments are not made, the service must be assigned to a stable null service.

The universal bit indicates whether the service is tied to the channel named in the channel number field, or whether if may be found on any channel carrying an MS waveform.

The channel number field determines which channel the service may be found on. If the service is defined as universal, the channel number defines one channel where the service may be found. The channel number is always defined unless the service is a null service, in which case the value is ignored.

The interface channels 18 carrying the MDS services may be found in the IF spectrum between 150 MHz and 404 MHz. Each channel has a 6 MHz bandwidth, and channel boundaries may occur anywhere in the range at 250 KHz increments. The exact channel allocations may differ between systems due to local noise conditions etc., and channel allocations may occasionally be changed. For this reason, channel configuration is also downloaded to the decoder 10.

Each interface channel 18 is identified by a one-byte channel number. This is an index for the service definition table 14. The headend downloads a channel configuration map 20 which maps the channel number to the actual frequency. The frequency is given as a 16 bit number in units of 250 KHz, allowing for frequencies up to 16 GHz to be specified. The decoder 10 will pass this number to the receiver 12 which is responsible for synthesizing the receive frequency format required by that receiver 12.

As well as providing flexible system configuration, this interface between the decoder 10 and the receiver 12 has the advantage of being able to specify non-MDS frequencies. VHF channel definitions can be downloaded this way, and tied into the service definition table. Future generations of receivers, which do not downconvert the MDS/ITFS signals, can also be accommodated under this scheme.

An important part of the decoder 10 intallation procedure consists of acquiring the channel configuration map 20 and service definition tables 14. For this purpose, one channel is identified as an installation channel, which should be available 24 hours a day. The service definition table 14 for stable services and the channel configuration map 20 is broadcast more frequently on the installation channel than on other channels. The installer will manually select the installation channel frequency to acquire these tables. Manual frequency selection will also be available as a backup procedure for reacquiring service configuration information.

As with service redefinition, channel reconfiguration takes effect immediately. Channels are reconfigured one at a time using a spare encoder. During the transition period, the spare encoder is tuned to the old frequency and is continuously broadcasting channel configuration information for the new frequency. Channel reconfiguration is expected to be an extremely rare event, so configuration information is broadcast at a very low rate on most channels.

We claim:

1. A receiver interface system for enabling an operator to access different services in a like manner, wherein some of the different services contain different types of combinations of one or more service components received by a receiver in different portions of one or more different frequency channels, comprising a plurality of separate interface channels for carrying different services containing different combinations of the service components;

switching means for selecting a said service, wherein the switching means is coupled to the interface channels for accessing the respective interface channels in a like manner; and a decoder coupled to the receiver and the interface channels for accessing the components of said selected service received by the receiver in different portions of one or more different frequency channels to provide said selected service on the interface channel carrying the selected service, wherein the decoder includes a service definition table defining access to different combinations of the service components by each of a plurality of the separate interface channels, including access to different types of combinations of the service components by some of the separate interface channels, to thereby define access to different services by the separate interface channels; and a channel configuration map defining access to the frequency channels by the separate interface channels for enabling the different combinations of service components for each of the services to be accessed in accordance with the service definition table.

2. A system according to claim 1, further comprising a service-to-channel map defining which services are provided on which interface channels.

3. A system according to claim 1, wherein the service definition table includes means for defining access to different service components located in the same portion of a given said frequency channel at different times.

4. A system according to claim 1, wherein the service definition table includes means for defining access to different service components located in all or some of the following portions of a given said frequency channel with respect to a television signal received over said frequency channel: the video information interval, the horizontal blanking interval, and the vertical blanking interval.

5. A system according to claim 1, wherein the service definition table includes means for defining access to different service components located in all or some of the following portions of a given said frequency channel with respect to a television signal received over said frequency channel: the video information interval, the horizontal blanking interval, the vertical blanking interval and the subcarrier of the given frequency.

6. A receiver having an interface system for enabling an operator to access different types of services in a like manner, wherein some of the services contain different types of combinations of one or more service components received in different portions of one or more different frequency channels, comprising means for receiving a plurality of service components in different portions of each of a plurality of different frequency channels;

a plurality of separate interface channels for carrying different types of services containing different combinations of said service components;

switching means for selecting a said service, wherein the switching means is coupled to the interface channels for accessing the respective interface channels in a like manner; and a decoder coupled to the receiver and the interface channels for accessing the components of said selected service received by the receiver in different portions of one or more different frequency channels to provide said selected service on the interface channel carrying the selected service, wherein the decoder includes a service definition table defining access to different combinations of the service components by each of a plurality of the separate interface channels, including access to different types of combinations of the service components by some of the separate interface channels, to thereby define access to different services by the separate interface channels; and a channel configuration map defining access to the frequency channels by the seprate interface channels for enabling the different combinations of service components for each of the services to be accessed in accordance with the service definition table.

7. A receiver according to claim 6, further comprising
a service-to-channel map defining which services are provided on which interface channels.

8. A receiver according to claim 6, wherein the service definition table includes means for defining access to different service components located in the same portion of a given said frequency channel at different times.

9. A receiver according to claim 6, wherein the service definition table includes means for defining access to different service components located in all or some of the following portions of a given said frequency channel with respect to a television signal received over said frequency channel: the video information interval, the horizontal blanking interval, and the vertical blanking interval.

10. A receiver according to claim 6, wherein the service definition table includes means for defining access to different service components located in all or some of the following portions of a given said frequency channel with respect to a television signal received over said frequency channel: the video information interval, the horizontal blanking interval, the vertical blanking interval and the subcarrier of the given frequency.

11. A receiver interface system for enabling an operator to access different services in a like manner, wherein some of the services contain different types of combinations of one or more service components received by a receiver in different portions of a frequency channel, comprising a plurality of separate interface channels for carrying different types of services containing different combinations of said service components;

switching means for selecting a said service, wherein the switching means is coupled to the interface channels for accessing the respective interface channels in a like manner; and a decoder coupled to the receiver and the interface channels for accessing the components of said selected service received by the receiver in different portions of one or more different frequency channels to provide said selected service on the interface channel carrying the selected service, wherein the decoder includes a service definition table defining access to different combinations of the service components by each of a plurality of the separate interface channels, including access to different types of combinations of the service components by some of the separate interface channels, to thereby define access to different services by the separate interface channels; and a channel configuration map defining access to the frequency channels by the separate interface channels for enabling the different combinations of service components for each of the services to be accessed in accordance with the service definition table.

12. A system according to claim 11, further comprising a service-to-channel map defining which services are provided on which interface channels.

13. A system according to claim 11, wherein the service definition table includes means for defining access to different service components located in the same portion of said frequency channel at different times.

14. A system according to claim 11, wherein the service definition table includes means for defining access to different service components located in all or some of the following portions of said frequency channel with respect to a television signal received over said frequency channel: the video information interval, the horizontal blanking interval, and the vertical blanking interval.

15. A system according to claim 11, wherein the service definition table includes means for defining access to different service components located in all or some of the following portions of said frequency channel with respect to a television signal received over said frequency channel: the video information interval, the horizontal blanking interval, the vertical blanking interval and the subcarrier of the given frequency.

* * * * *